United States Patent [19]

Shafer

[11] 3,911,293

[45] Oct. 7, 1975

[54] SENSE THRESHOLD AMPLIFIER FOR HIGH DENSITY MEMORY

[75] Inventor: Philip E. Shafer, Holmes, Pa.

[73] Assignee: Burroughs Corporation, Detroit, Mich.

[22] Filed: Mar. 20, 1974

[21] Appl. No.: 452,831

[52] U.S. Cl. .............. 307/235 R; 307/236; 307/261; 307/268

[51] Int. Cl.[2] .............. H03K 5/20

[58] Field of Search ........ 307/235 R, 236, 261, 268; 330/30 R

[56] References Cited

UNITED STATES PATENTS

| | | | |
|---|---|---|---|
| 3,432,688 | 3/1969 | Zola | 307/237 |
| 3,441,747 | 4/1969 | Van Dine | 307/236 |
| 3,553,491 | 1/1971 | Schulz | 307/236 X |

*Primary Examiner*—John Zazworsky
*Attorney, Agent, or Firm*—Manuel Quiogue; Kenneth Watov; William B. Penn

[57] ABSTRACT

A sense threshold amplifier for use in high density memories, providing fast recovery from large noise signals and discrimination between analog sense signals to produce a logic level output. The sense amplifier comprises a pair of differentially driven emitter-followers for linearly amplifying the sense signals and for cutting off noise signals having amplitudes greater than the amplitude of the sense signals; a resistor-capacitor-diode network for coupling negative going sense signals representing a digital ONE and positive going sense signals representing a digital ZERO from the output of one of the emitter-followers to the base of an input transistor of a transistor amplifier, and for bypassing high level noise from the transistor amplifier to prevent false outputs; a resistor-capacitor network for coupling sense signals, equal in amplitude and opposite in polarity to the sense signals inputted at any given time to the resistor-capacitor-diode network, from the output of the other emitter-follower to the emitter of the input transistor of the amplifier, and a threshold detector, capacitively coupled to the output of an emitter-follower driven by the transistor amplifier, for outputting a pulse whenever the amplitude of the amplified sense signal exceeds a predetermined threshold level set by a resistor-diode network.

9 Claims, 1 Drawing Figure

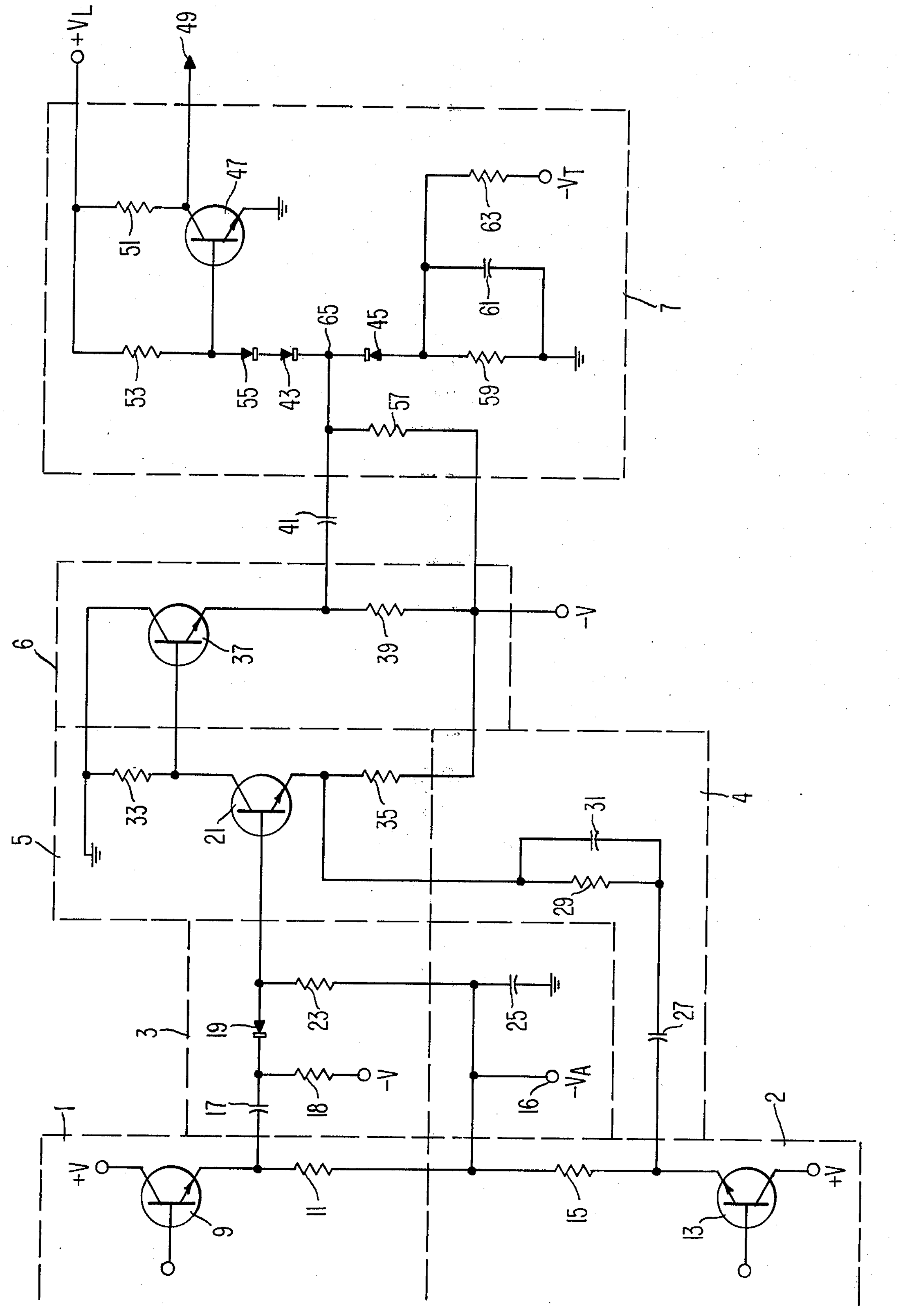
+VL
49
47
51
53
55
43
65
45
63
-VT
61
59
57
7
41
6
37
39
-V
5
33
21
35
31
4
29
3
19
23
25
27
18
-V
16
-VA
17
1
2
+V
9
11
15
13
+V

SENSE THRESHOLD AMPLIFIER FOR HIGH DENSITY MEMORY

BACKGROUND OF THE INVENTION

This invention relates generally to amplifier circuits, and more specifically to a sense threshold amplifier for high density memory systems. In general, the invention provides a sense amplifier having high noise immunity and fast recovery from saturation due to high level noise. The invention is primarily used in thin film memory systems to detect analog sense signals representative of digital data to produce a logic level output.

Prior art sense amplifier are not readily adaptable for use in thin film memory systems, due to low signal levels and high digit noise that are inherent in the sense signals obtainable from thin film memories. The noise may cause such amplifiers to lock up or saturate, wherein errors will occur in the output signal unless the amplifier has high speed recovery from saturation to full sensitivity.

The use of resistor-diode networks for establishing a desired switching threshold level or clamping level is well-known in the prior art. For example, such networks are disclosed in Gunderson et al U.S. Pat. No. 3,482,111, and in Bogdan, Jr. et al U.S. Pat. No. 3,159,751.

SUMMARY OF THE INVENTION

Accordingly, with these prior art problems in mind, it is an object of this invention to improve sense threshold amplifier circuits.

Another object of this invention is to provide an improved sense threshold amplifier circuit for sensing analog dipole sense signals to produce a logic level output.

A further object of this invention is to provide an improved sense amplifier circuit with fast recovery from saturation due to digit noise.

These and other objects and advantages are accomplished in a circuit including a pair of differentially driven clipping emitter-followers from which the analog dipole sense output signals are differentially coupled through a resistor-capacitor-diode network and resistor capacitor network, respectively, to an amplifier for amplifying the sense signals. The resistor-capacitor-diode network also bypasses noise from the amplifier, whereas the emitter-followers clip noise having an amplitude greater than that of the sense signals. The output of the amplifier drives a threshold detector for outputting a pluse indicative of a digital ONE, whenever the amplified sense signal exceeds a predetermined threshold level.

BRIEF DESCRIPTION OF THE DRAWINGS

The foregoing objects and advantages of the invention, together with other advantages, which may be obtained by its use, will be apparent from the following detailed description of the invention when read in conjunction with the drawing which is a schematic diagram of the sense threshold amplifier.

DETAILED DESCRIPTION OF THE INVENTION

The sense threshold amplifier of the invention as shown in the drawing, comprises a pair of emitter-followers 1, 2, a resistor-capacitor-diode coupling network 3, a resistor-capacitor coupling network 4, transistor amplifier 5, an output emitter-follower 6, and a transistor switch output stage 7.

The emitter-followers 1, 2 are designated as the "first input" and "second input" respectively. The first input emitter-follower 1 includes an NPN transistor 9, with its collector connected to a positive voltage source +V, and its emitter interconnected through a resistor 11 to a negative voltage source $-V_A$. The second input emitter-follower 2 includes a NPN transistor 13, with its collector connected to a positive voltage source +V, and its emitter connected through a resistor 15 to the dc return 16. Incoming analog dipole sense signals representing a logical ONE or logical ZERO are fed differentially through two leads from a balanced or differential amplifier (not shown in the figure) to the sense threshold amplifier, and are sensed through the bases of the transistors 9, 13 of the emitter-followers 1, 2.

The resistor-capacitor-diode network 3 includes a coupling capacitor 17 connected between the emitter of the NPN transistor 9 of the first input emitter follower 1 and the cathode of a diode 19. The junction of the capacitor 17 and diode 19 is connected through a resistor 18 to a negative voltage supply −V. The anode of of the diode 19 is connected to the base of an NPN transistor 21 included in the transistor amplifier 5, and through a resistor 23 to the negative voltage source $-V_A$. A bypass capacitor 25 is connected from the negative voltage source $-V_A$ to ground.

The resistor-capacitor network 4 includes a coupling capacitor 27 with one end connected to the emitter of the NPN transistor 13 of the second input emitter-follower 2. The other end of the capacitor 27 is connected to a parallel circuit including a resistor 29 in parallel with a capacitor 31, the other end of the parallel circuit being connected to the emitter of the NPN transistor 21 of the transistor amplifier 5.

The NPN transistor 21 of the transistor amplifier 5 has its collector connected to a grounding resistor 33, and its emitter connected through a resistor 35 to a negative voltage −V.

The output emitter-follower 6 includes an NPN transistor 37, with its collector grounded, its emitter connected through a resistor 39 to a negative voltage source −V and also through a coupling capacitor 41 to the cathodes of two diodes 43 and 45 of the output stage 7. The base of the NPN transistor 37 of the output emitter-follower 6 is connected to the collector of the NPN transistor 21 of the transistor amplifier 5.

The first input and second input emitter-followers 1, 2 are the outputs of a balanced or differential amplifier. Sense signals outputted from the balanced amplifier are always within the linear range of the balanced amplifier, and are analog signals at this point. The sense threshold amplifier converts these analog signals to a digital output.

The output stage 7 includes an NPN switching transistor 47, with its collector connected to the output terminal 49 of the sense threshold amplifier and through a resistor 51 to a positive logic voltage $+V_L$. The NPN switching transistor 47 also has its emitter grounded, and its base connected through a resistor 53 to the positive logic voltage $+V_L$. The anode of a diode 55 is connected to the base of the NPN switching transistor 47. The cathode of the diode 55 is connected to the anode of the diode 43, the cathode of the diode 43 being connected through a resistor 57 to a negative voltage source −V. The cathode of the diode 43 is also connected to the cathode of diode 45 and to coupling capacitor 41 (as described previously). The anode of the diode 45 is connected through a resistor 59 and a capacitor 61 in parallel to ground, and through a resistor 63 to a negative threshold voltage $-V_T$.

Negative going sense signals inputted to the first input emitter-follower 1 are indicative of a digital ONE. Positive going sense signals inputted to the first input emitter-follower 1 are indicative of a digital ZERO. In the circuitry in which the sense threshold amplifier is utilized, sense signals will be simultaneously inputted to the first input emitter-follower 1 and the second input emitter-follower 2, with equal amplitudes and opposite polarities. As interconnected within the sense threshold amplifier circuit, the first input and second input emitter-followers 1, 2 essentially linearly amplify the inputted sense signals, and output substantially positive going sense signals.

In the absence of substantial noise, sense signals outputted from the first input emitter-follower 1 are coupled through the capacitor 17 and diode 19 of the resistor-capacitor-diode network 3 to the base of the NPN transistor 21 of the transistor amplifier 5. The diode 19 is forward biased to the extent that positive and negative going sense signals will in normal operation be passed through to the base of the NPN transistor 21 of the transistor amplifier 5. Positive noise bursts may be outputted from the first input emitter-follower 1 to the resistor-capacitor-diode network 3. Large positive excursions of the noise will cutoff diode 19 and charge the coupling capacitor 17 through the resistor 18 to the negative voltage source $-V$, substantially preventing saturation of the amplifier 5. When the noise subsides, the diode 19 will again become forward biased, and the coupling capacitor 17 will discharge through the emitter resistor 11 of the first input emitter-follower 1 to the negative voltage source $-V_A$.

In this manner, positive noise is bypassed from the transistor amplifier 5, and sense signals representing a logic ONE or logic ZERO are coupled to the transistor amplifier 5. Negative and positive going portions of noise bursts are also clipped by the first input emitter-follower 1, thereby substantially preventing such negative going noise from being coupled through capacitor 17 and diode 19 to the base of the NPN transistor 21 of the amplifier 5 and reducing the level of positive noise. The time constants involved in charging and discharging the coupling capacitor 17 are made very large to insure that the capacitor charges only to a small percentage of the amplitude of the positive going noise voltage inputted to the system, resulting in a small net charge over a period of time, depending on the duration and not the amplitude of the noise voltage. The noise duration is much smaller than the time constants, and as explained previously, the first input emitter-follower 1 clips any negative noise exceeding an amplitude not much greater than the normal signal input. Diode 19 clips positive going excursions of noise.

The output of the second input emitter-follower 2 is coupled through the resistor-capacitor network 4 to the emitter of the NPN transistor 21 of the transistor-amplifier 5, wherein positive going sense signals will tend to drive the NPN transistor 21 toward cutoff. Similarly, positive going digit noise outputted from the second input emitter-follower 2 will cutoff the transistor amplifier 5 during large positive excursions of noise. The coupling capacitor 27 of the resistor-capacitor network 4 will discharge during "quiet times" through the emitter resistor 15 of the second input emitter-follower 2; and charge, during the presence of positive going noise bursts or sense signals, through the parallel circuit resistor 29 in series with the emitter resistor 35 of the amplifier 5 to the negative voltage source $-V$.

Negative going noise outputted from the second input emitter-follower 2 will be limited or clipped by cutoff of transistor 13. During such times capacitor 27 charges negatively through resistor 15 to voltage $-V_A$. The time contants involved in charging and discharging coupling capacitor 27 are made very large to average the capacitor charge due to positive and negative going noise, to insure that the net charge over a period of time is small.

It is important to note that the first input and second input emitter-followers 1, 2 are interconnected by a differential or balanced amplifier (not shown) to a sense line of a thin film memory. The sense line is used to "sense" signals representative of data stored in the memory. Operation of thin film or core memories using sense lines is well-known in the prior art, and accordingly will not be detailed herein. The sense line is equivalent to a loop or wire and in this system, in which the subject sense amplifier is used, the ends of the loop are each connected to individual inputs of the differential amplifier. As a result, any noise picked up by the sense line will be differentially outputted to the first input and second input emitter-followers 1, 2, wherein if the noise is positive going at the input of the first input emitter-follower 1, the noise will at the same time be negative going at the input to the second input emitter-follower 2. A short time later, the noise polarities will be reversed, with a negative going noise signal appearing at the input of the first input emitter-follower 1, and a positive going noise appearing at the input of the second input emitter-follower 2. Accordingly, for any given cycle of digit noise or noise burst, equivalent amounts of positive going noise are inputted through the first and second input emitter-followers 1, 2 to their respective coupling capacitors 17, 27. Furthermore, since the input to the differential amplifier cannot generate a d.c. level, a positive digit noise must be followed by negative noise, thereby discharging capacitors 17 and 27.

The circuit parameters have been chosen to insure that the coupling capacitors 17, 27 take on equal net charges due to any given digit noise burst. This is a necessary embodiment of the circuit design to insure fast recovery from digit noise. The charges on the coupling capacitors 17, 27 are differentially applied across the base and emitter junctions of the transistor 21 of the transistor amplifier 5; wherein since the capacitors 17, 27 are equally charged after a noise cycle, the only effect on the amplifier 5 is to shift the amplifier's operating point slightly. As a result, the amplifier 5 is rendered operable within the time it takes the diode 19 interconnecting the coupling capacitor 17 to the amplifier 5 to again become forward biased or recover from a digit noise burst. In other words, the transistor 21 of the transistor amplifier 5 has a zero differential voltage applied to it after noise bursts, as a result of the equivalently charged coupling capacitors 17, 27. As soon as the noise subsides, the diode 19 becomes forward biased and conducts regardless of the charge remaining on coupling capacitor 17. In this manner the sense threshold amplifier 5 rapidly recovers from digit noise signals.

The circuit design assumes that the duration of negative noise in time is equal to the duration of positive noise in time, wherein no net charge will be on capacitors 17 and 27. This is not always the case, and the sense threshold amplifier may not, at all times, as a result, be operating under the assumed conditions. Under non-ideal conditions, the coupling capacitors 17, 27 may not take on zero net charges due to a noise cycle, but for ordinary operating conditions this will not hinder proper operation of the sense threshold amplifier, which will operate correctly even with a large shift of the operating point of the amplifier 5. For this reason, the coupling capacitors are chosen to have large enough values to insure that any differences in net charge will produce small differences in voltage. Over long periods of time the net charges on the coupling capacitors 17, 27 are substantially equal.

The output of the transistor amplifier 5 drives the output emitter-follower 6. The output of the output emitter-follower 6 is coupled through a coupling capacitor 41 to the transistor switch output stage 7 including the transistor switch 47.

The switching threshold level of the NPN transistor switch 47 is determined by diodes 43, 55 and 45, the magnitude of the positive logic voltage $+V_L$, the magnitude of the negative threshold voltage $-V_T$, and the resistance values of the resistors 53, 57 and 63. Diode 55 also provides temperature compensation for the NPN switching transistor 47, and the voltage drops in diodes 43 and 45 compensate. As a result, the threshold is temperature stable.

In the absence of negative going digit ONE sense signals at the input of the sense amplifier, the diodes 55, 43, 45 of the transistor switch output stage 7 are forward biased, causing the NPN switching transistor 47 to be inoperative, wherein the output of the sense threshold amplifier is a positive voltage equal in magnitude to the positive logic voltage $+V_L$.

A negative going sense signal indicative of a digital ONE, amplified and inverted by the transistor amplifier 5, and outputted from the output emitter-follower 6 as a positive going signal to the transistor switch output stage 7, will cause diodes 55, 43 and 45 to become back biased, in turn causing the NPN switching transistor 47 of the output stage 7 to energize, whereupon the output 49 of the sense threshold amplifier will drop from the positive logic level $+V_L$ to ground. The sense threshold amplifier output 49 will remain grounded for a period of time somewhat greater than the duration of the analog sense input signal, representing a digital ONE, due to pulse stretching or integration caused by the inherent capacitance in amplifier 5 and in the output emitter-follower stage 6. This is a favorable circuit action in that longer ONES yield a wider strobe window. Accordingly, the negative going pulse outputted from the output terminal 49 and sense threshold amplifier is indicative of a digital ONE. The presence of capacitor 31 is for partial compensation of the integration mentioned above.

The following component values have been found to be suitable for use in the illustrated embodiment of this invention:

Table of Component Values

| Type | Item No. | Value or Part Number |
|---|---|---|
| Transistors | 9,13,21,37,47 | FK918 |
| Resistor | 11 | 15 |
| Resistor | 15 | 8.2 |
| Capacitors | 17,27 | 0.1 |
| Resistor | 18 | 12 |
| Diodes 19,43,45,55 | GVL 20369 | |
| Resistor | 23 | 0.510 |
| Capacitor | 25 | 0.01 |
| Resistor | 29 | 100 |
| Capacitors | 31,41 | 0.001 |
| Resistor | 33 | 2.2 |
| Resistor | 35 | 5.6 |
| Resistor | 39 | 10 |
| Resistor | 51 | 1.6 |
| Resistor | 53 | 9.1 |
| Resistor | 57 | 15 |
| Resistor | 59 | 0.10 |
| Capacitor | 61 | 0.001 |
| Resistor | 63 | 0.330 |
| Positive Voltage Supply | $+V$ | +15V |
| Negative Voltage Supply | $-V$ | −15V |
| Positive Logic Voltage | $+V_L$ | +4.8V |
| Negative Threshold Voltage | $-V_T$ | −2.0V |
| | $-V_A$ | −7 |

All values of resistance are given in K-ohms. All values of the capacitors are given in microfarads.

The above-listed component values and the voltage levels given in the description and the drawings are for illustrative purposes only and, as is clear to one skilled in the art, many other choices of both are available. It should also be clear that the specific circuit configuration shown and the thin film memory system in which it is used are given by way of example only and are not to be construed as limitations on the scope of the present invention, which is limited only by the appended claims.

If the component values are used as given in the table, the transistor amplifier 5 will have a gain of approximately 30, and the threshold voltage level of the transistor switch output stage 7 as seen at node 65, the junction of the diodes 43 and 45, will be about 1.5 volts. So configured, the sense threshold amplifier is capable of detecting 50 millivolt sense input signals. Also, for noise voltages in excess of 2 volts as seen at the input to the sense threshold amplifier, the sense threshold amplifier is capable of recovering from such noise within 120 to 200 nanoseconds.

The output section of the sense threshold amplifier will now be described in more detail. As previously explained, negative going sense signals indicative of a digit one and outputted from the output emitter-follower 6 are coupled through coupling capacitor 41 to the junction of the collectors of diodes 43, 45, wherein if such signals exceed the threshold level, the diodes 55, 43, 45 will be back-biased causing the NPN switching transistor 47 to energize, in turn causing the output of the sense threshold amplifier to emit a negative going pulse indicative of a logic digital ONE. With the component values as given in the table, the sense digit ONE signal as outputted from the output emitter-follower 6 must be at least 1.5 volts in amplitude in order to cause the NPN switching transistor 47 to operate. When this condition occurs, the coupling capacitor 41 charges through resistor 57 to the −15 volt supply. When the digit ONE sense signal inputted to the sense threshold amplifier is no longer present at the input of the sense amplifier, the transistor amplifier 5 will ground the base of the NPN transistor 37 of the output emitter-follower 6, causing the output emitter-follower 6 to be cutoff, whereupon the coupling capacitor 41 will discharge through resistor 39, diode 45 in series with resistor 59, and series diodes 43, 55 in series with resistor 53.

When a positive signal larger than the threshold is present, diodes 55 and 43 are cutoff and the switch transistor 47 energized, as has been explained. Use of the component values given in the table provide a turn-on current for the switching transistor 47 of about 0.5 ma. Accordingly, turnoff current to the base of the switching transistor 47 is 0.5 ma, causing the logic one output of the sense threshold amplifier to be stretched by the inherent storage time of the switching transistor 47.

What is claimed is:

1. A sense amplifier for detecting analog sense signals representative of digital data, said signals in one polarity representing digital "ONES" and in an opposite polarity representing digital "ZERO'S", said signals being differentially inputted to the sense amplifier over a first lead and a second lead, respectively, comprising:

first and second means for sensing, linearly amplifying, and clipping voltages incoming over said first and second leads respectively;

an amplifier means including a current-control device having a control electrode and first and second current-carrying electrodes, said first current-carrying electrode being resistively grounded and having an output therefrom and said second current-carrying electrode being connected through a resistance to a first dc voltage source;

means receiving voltages from said first sensing, linearly amplifying and clipping means for coupling sense signals to the control electrode of said current control device of said amplifier means and for diverting noise away from said amplifier means; and means receiving voltages from said second sensing, linearly amplifying and clipping means for coupling sense signals to said second current carrying electrode of said current control device of said amplifier means, a current flow in said second current-carrying electrode being inhibited by sense signals representing a digital ONE.

2. The sense amplifier of claim 1, further including means coupled to the output of said amplifier means for producing a pulse whenever the sense signal outputted from said amplifier means exceeds a predetermined threshold level, enabling said sense amplifier to operate as a sense threshold amplifier.

3. The sense amplifier of claim 1, wherein each of said first and second sensing, linearly amplifying and clipping means includes a transistor configured as an emitter-follower.

4. The sense amplifier of claim 3, wherein said means for coupling sense signals to the control electrode of said current control device and for diverting noise away from said amplifier means includes:

a diode; and a first coupling capacitor for interconnecting the output of the emitter-follower of said first sensing, linearly amplifying and clipping means to the cathode of said diode, the junction of said capacitor and diode being resistively connected to said first dc voltage source, the anode of said diode being connected to the control electrode of said current control device and resistively connected to a second dc voltage source.

5. The sense amplifier of claim 4, wherein said means for coupling sense signals from the output of the emitter-follower of said second sensing, linearly amplifying and clipping means to said second current-carrying electrode of said current control device of said amplifier means includes:

a parallel circuit having a resistive element and a capacitive element in parallel; and a second coupling capacitor interconnecting the output of the emitter-follower of said second sensing, linearly amplifying and clipping means to an end of said parallel circuit, the other end of said parallel circuit being connected to said second current-carrying electrode of said current control device.

6. The sense amplifier of claim 2, wherein said pulse producing means includes:

an output emitter-follower having an input connected to the output of said amplifier means;

a threshold detector; and a coupling capacitor for interconnecting an output of said output emitter-follower to said threshold detector.

7. The sense amplifier of claim 6, wherein said threshold detector includes:

an NPN switching transistor having base and collector electrodes each resistively connected to a positive voltage source, a grounded emitter electrode, said collector electrode also being connected to an output of said sense threshold amplifier; and means for determining the switching threshold level of said switching transistor, said threshold determining means being interconnected to said coupling capacitor and the base of said switching transistor.

8. The sense amplifier of claim 7, wherein said threshold determining meas includes:

a pair of diodes unidirectionally connected in series, the anode of one of the diodes being connected to the base of said NPN switching transistor, and the cathode of the other diode being connected to said coupling capacitor; and a current steering diode having its cathode connected to said coupling capacitor and resistively connected to said first dc voltage source, and its anode resistively and capacitively connected to ground and resistively connected to a negative threshold voltage.

9. The sense amplifier of claiam 1, wherein the current control device of said amplifier means includes an NPN transistor having a base for said control electrode, a collector for said first current carrying electrode connected to an output of said amplifier means, and an emitter for said second current carrying electrode; and wherein said first dc voltage source is a negative voltage source.

* * * * *